(12) United States Patent
Specht et al.

(10) Patent No.: US 9,519,675 B2
(45) Date of Patent: Dec. 13, 2016

(54) DATA ACCESS MANAGEMENT DURING ZERO DOWNTIME UPGRADE

(71) Applicants: Juergen Specht, Gerabronn (DE); Lars-Eric Biewald, Mannheim (DE); Heiko Konrad, Hockenheim (DE); Steffen Meissner, Heidelberg (DE); Wieland Hoprich, Mannheim (DE); Volker Driesen, Heidelberg (DE)

(72) Inventors: Juergen Specht, Gerabronn (DE); Lars-Eric Biewald, Mannheim (DE); Heiko Konrad, Hockenheim (DE); Steffen Meissner, Heidelberg (DE); Wieland Hoprich, Mannheim (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 252 days.

(21) Appl. No.: 14/504,241

(22) Filed: Oct. 1, 2014

(65) Prior Publication Data

US 2016/0098443 A1 Apr. 7, 2016

(51) Int. Cl.
*G06F 7/02* (2006.01)
*G06F 17/30* (2006.01)
*G06F 9/445* (2006.01)

(52) U.S. Cl.
CPC .......... *G06F 17/30377* (2013.01); *G06F 8/65* (2013.01); *G06F 8/67* (2013.01); *G06F 17/30292* (2013.01)

(58) Field of Classification Search
None
See application file for complete search history.

(56) References Cited

U.S. PATENT DOCUMENTS

| | | | |
|---|---|---|---|
| 2010/0161551 A1* | 6/2010 | Whynot | G06F 11/2094 707/610 |
| 2012/0089566 A1* | 4/2012 | Effern | G06F 17/30377 707/611 |
| 2015/0112923 A1* | 4/2015 | Driesen | G06F 17/30377 707/609 |
| 2015/0169757 A1* | 6/2015 | Kalantzis | G06F 17/30569 707/722 |

OTHER PUBLICATIONS

"Introduction to Zero Downtime Upgrade Method," Oracle Access Manager Upgrade Guide 10g (10.1.4.2.0), Gail Tiberi Flanagin et al, Copyright 2000, 2007, Part IV Chapters 15-17 pp. 301-503, Oracle USA.*

* cited by examiner

*Primary Examiner* — Bruce Moser
(74) *Attorney, Agent, or Firm* — Mintz Levin Cohn Ferris Glovsky and Popeo, P.C.

(57) ABSTRACT

A zero downtime upgrade procedure upgrading a source system to a target system is initiated that prepares software for the target system in parallel to the operation of the source system. As part of the upgrade procedure, source tables of the source system are renamed. Thereafter, the renamed source tables are cloned for the target system. Further, the renamed source tables are equipped with database triggers to transfer data from the renamed source tables to the cloned tables used by the source system according to a source database schema. Next, the target tables are generated that include updated software content for later use by the target system while the source tables are used via a bridge database schema. Tables can then be shared between the source database schema accessed via the bridge database schema and the target system.

20 Claims, 15 Drawing Sheets

1100

Switch to Target
Potentially run "Business Validation"

DATA ACCESS MANAGEMENT DURING ZERO DOWNTIME UPGRADE

TECHNICAL FIELD

The subject matter described herein relates to the management of data access during a zero downtime upgrade.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, zero downtime upgrades. With such arrangements, upgrades run in parallel to a production system within the same database for the complete duration of the upgrade. The procedure creates clones of the tables, which are changed by the upgrade and runs database triggers to replicate data from production to the upgrade copy of the tables. With the maintenance procedure running in parallel with the production system in the same database, the upgrade can no longer be revoked by restoring a backup.

A restore of a backup is usually done as a point-in-time recovery: the full backup is restored, then the re-do-logs of the changes done to the system between the point in time of the full backup and the point in time, the administrator wants to restore are rolled forward. Such restores can only be run for the complete database.

During the upgrade procedure, not only is database content deployed, but software modules are also being executed (after-import-methods). For these software modules, it can be rather complicated to automatically determine, which database tables are read and written. The upgrade tool initiating the upgrade procedure can be provided with metadata about the database access for each after-import-method and/or accesses can be provided manually.

If there are errors in the metadata or the computation of any corresponding categories, the upgrade procedure can endanger the consistency of the production system during the course of the upgrade. For example, the upgrade can write data to a table that is shared. The production system can then read this data and this data may corrupt the business processes (i.e., the content of the target software package is written to the start release software and this mixture is not guaranteed to properly work). In addition, the database content computed as part of the upgrade procedure can in some cases become corrupted (i.e., data which is read by the upgrade procedure is not correctly locked against changes by the production system).

SUMMARY

In one aspect, a zero downtime upgrade procedure upgrading a source system to a target system is initiated that prepares software for the target system in parallel to the operation of the source system. As part of the upgrade procedure, source tables of the source system are renamed. Thereafter, the renamed source tables are cloned for the target system. Further, the renamed source tables are equipped with database triggers to transfer data from the renamed source tables to the cloned tables used by the source system according to a source database schema. Next, the target tables are generated that include updated software content for later use by the target system while the source tables are used via a bridge database schema. Tables can then be shared between the source database schema accessed via the bridge database schema and the target system.

In some variations, restricting access to at least one table other than the cloned tables can include determining which of a plurality of a tables should have restricted access during the upgrade procedure, generating a names table comprising runtime objects corresponding to those tables, deleting runtime objects from the names table that cannot be accessed during the upgrade, and adding runtime objects to the names table corresponding to those tables that are determined not to be able to be accessed during the upgrade after completion of the upgrade procedure.

The names table can include a metadata declaration for each listed runtime object. The names table can include field names and information types for each listed runtime object. The restricted access can prevent both read and write accesses to the corresponding tables.

Attempts to access the tables with restricted access can, in some implementations, be logged in a logging table. The logging can include storing the corresponding database table name, the accessed key, and a current timestamp. There can be a dedicated logging table for each table for which access is requested while, in other variations, there is a single logging table for each of a plurality of tables for which access is requested.

In other variations, access to at least one table other than the cloned tables can be restricted by preventing both read and write access to the at least one table. In other scenarios, write access to the at least one table can be prevented while read access is allowed (to enable, for example, selective testing of the system).

Restricting access to at least one table other than the cloned tables can include determining which of a plurality of a tables should have restricted write access during the upgrade procedure, generating, for each table for which it was determined that should have restricted write access, a database trigger which prevents write accesses to the table, and removing the database triggers preventing write access to the tables after completion of the upgrade procedure.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter guarantees that the upgrade tools only are able to access certain predefined content thereby reducing the risks of negatively affecting production systems. Furthermore, the current subject matter is advantageous in that it allows for the automatic testing of upgrade tools and any provided metadata.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter enables selective blocking of read and/or write access of content as part of a zero downtime maintenance/upgrade procedure. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, the current subject matter enables the selective disablement of access to unmanaged tables during an upgrade procedure. Unmanaged tables as used herein, are tables which are not cloned (due to analysis of the delta import and structure change needs), which are not put to read-only for the production running on the source release and which are not mentioned by the metadata provided by the source system and the after-import methods.

Figure 1:
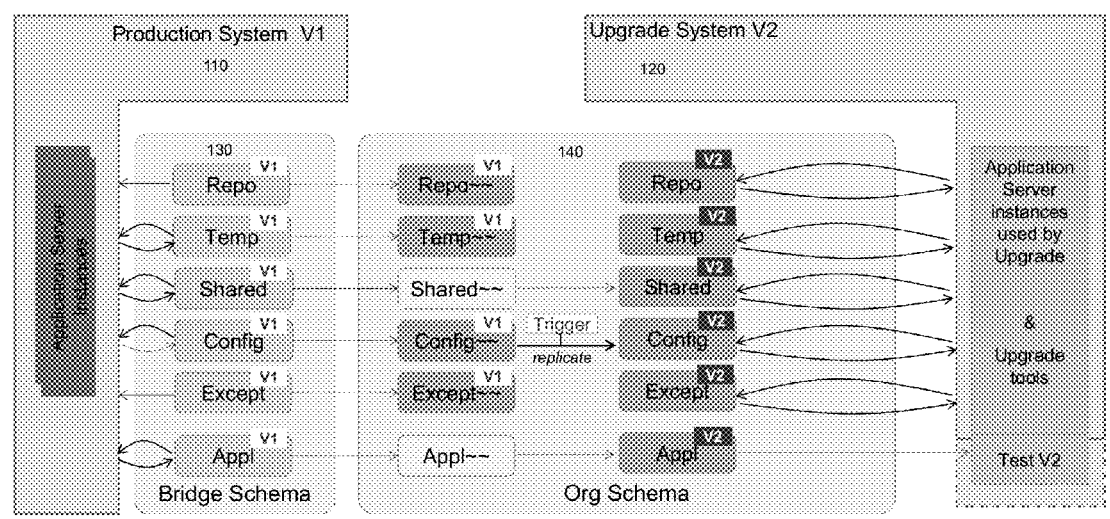
FIG. 1 is a first diagram illustrating a zero downtime upgrade procedure.

FIG. 1 is a diagram 100 illustrating a process of a zero downtime upgrade of a production system 110 (sometimes referred to as a source system) to an upgrade system 120 (sometimes referred to as a target system). The production system 110 runs various application server instances executing a first version of software (as indicated by the designation V1) and the upgrade system 120, when upgraded, runs various application server instances running a second version of software (as indicated by the designation V2). As part of a zero-downtime upgrade from the production system 110 to the upgrade system 120, a bridge schema 130 provides various tables of data that are in turn used by an original schema 140 to generate/populate alias tables that, in turn, are used to generate tables that are ultimately used by the upgrade system 120. In some cases, the upgrade system 120 can be tested prior to going live. Further details are provided below.

Figure 2:
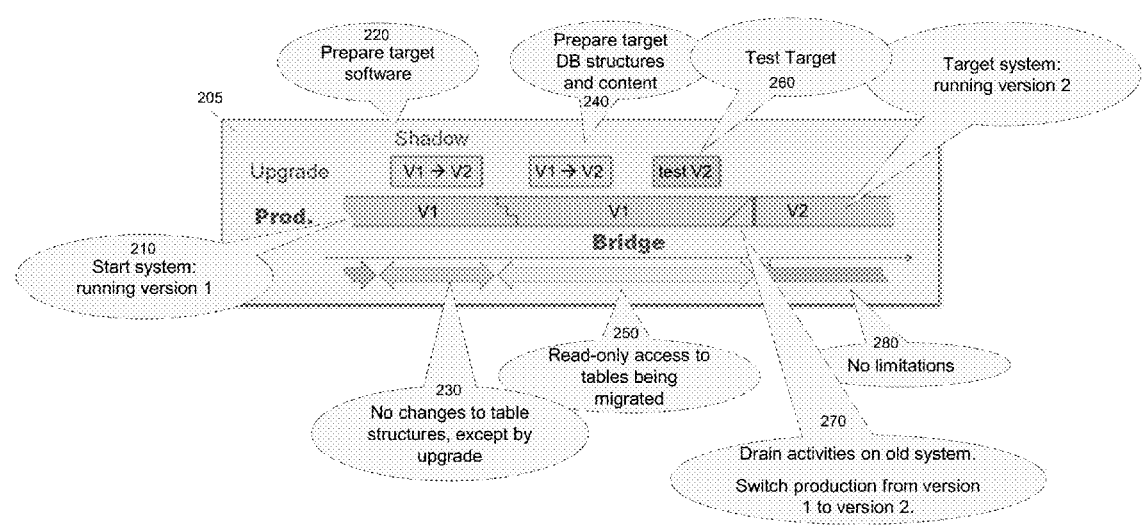
FIG. 2 is a first diagram illustrating a zero downtime upgrade procedure.
Figure 3:
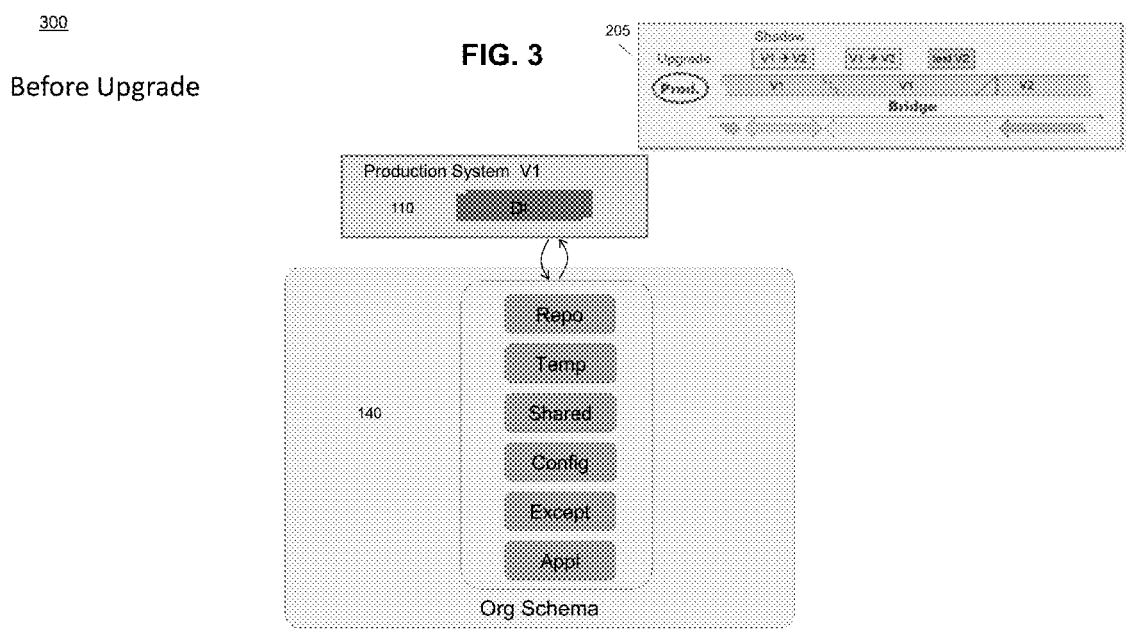
FIGS. 3-12 provide a sequence of a zero downtime upgrade procedure.

FIG. 2 is a diagram 200 providing an overview of a zero downtime upgrade process moving from version 1 (V1) software on a production system to version 2 (V2) software on the target system. With reference to the legend 205, at 210, the production system is initially running version 1 software. Subsequently, at 220, target software including (shadow tables) is prepared. No changes are made, at 230, to table structures except where upgrades require changes. Thereafter, at 240, target database structures and content are prepared. During such time, at 250, the tables being migrated are only accessible via read-only access. Prior to deployment, at 260, the target software can be tested. If the testing is successful, at 270, production is switched from version 1 to version 2 and, at 280, activities are drained/ceased on the old production system.

Stated differently, a zero downtime maintenance procedure can work by first generating upgrade scripts. Thereafter, revoke scripts can be generated. Next, the application upgrade package can be analyzed so that it can be derived which tables get content by the upgrade package, are changed in structure by the upgrade package (so that such tables can be categorized based on their treatment in the upgrade). In addition, the target software (i.e., the upgraded software) can be prepared in parallel to production use. The target database tables are also prepared. In case the table gets content, it is cloned: a copy can be created including all content and one or more triggers ensure the content remains up-to-date to changes. In cases in which a table's content is migrated, a copy of the table is created and the original table can be designated as read-only and a migration report can be run. Thereafter, the upgraded content is deployed to the cloned tables. After the target version is tested and confirmed to be working properly, users can be switched to the target version.

The tables in the database can be sorted into various categories. First, there are the Config tables that receive the content for the upgrade. The Config tables can be cloned by creating a copy of the table and having a database trigger replicate all data from the table used by production to the table used by the upgrade to deploy new data. The table used by production is consistent in structure and content with respect to the start release. Furthermore, upon the switch of production to target version, the production is configured to use also the target table.

Another type of table does not receive content for the upgrade but their structure is adjusted (e.g., new fields are added, etc.). The access by production to such tables can be redirected to a projection view on the table. The view can include the same fields of the table's structure as of the start release version. Subsequently, these tables can be extended on the database level through the addition of new fields. The production can access this extended table There can additionally be tables that are not touched by the upgrade. That is, neither the structure nor the content of such tables are changed. With such tables, locks can be set, either for the complete table or for single rows.

Another type of table can be referred to as an Except table. With these tables, other types of changes are made that can be put to read-only for the bridge. For example, if a field is set to be longer, the table is then part of the Except category. These tables can be set to read-only for the production. A table with a different name can be created, but with the tables target structure. Thereafter, a batch job can be run, which transfers all data from the original table to the target table. Upon the switch of production to target version, the production can be configured to also use also target table.

Figure 4:
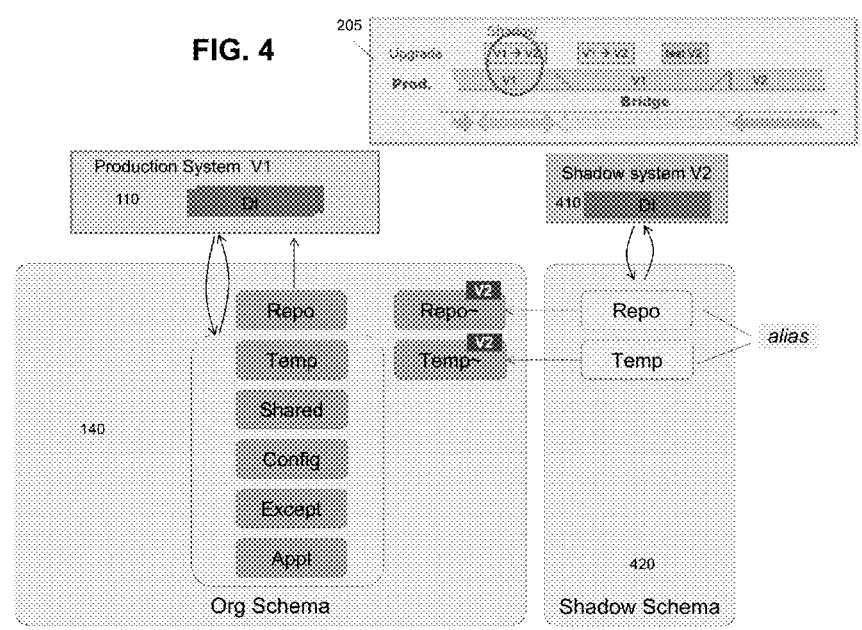

FIGS. 3-12 provide an overview zero downtime upgrade procedure. With reference to diagram 300 of FIG. 3, before the upgrade, user can use a dialog instance connected to a standard schema. Diagram 400 of FIG. 4 illustrates an uptime and shadow system period in which preparation checks are run. Maintenance mode is switched on (no changes to table structures except by upgrade). In addition, a shadow system 400 with shadow schema 410 is set up, the target software is deployed to tables "Repo~" and the target structures of the tables are computed. The shadow system is a mechanism to prepare the content in the shadow tables named TABLE~, e.g. for the repository content stored in Repo~. Details regarding the use of a shadow system can be found in U.S. Pat. No. 7,523,142 entitled: "Systems, methods and articles of manufacture for upgrading a database with a shadow system", the contents of which are hereby fully incorporated by reference. Changes brought by the upgrade can be analyzed to determine which tables for migration are to be cloned later. In addition, the content brought by the upgrade can be analyzed to determine which tables to later clone.

Figure 5:
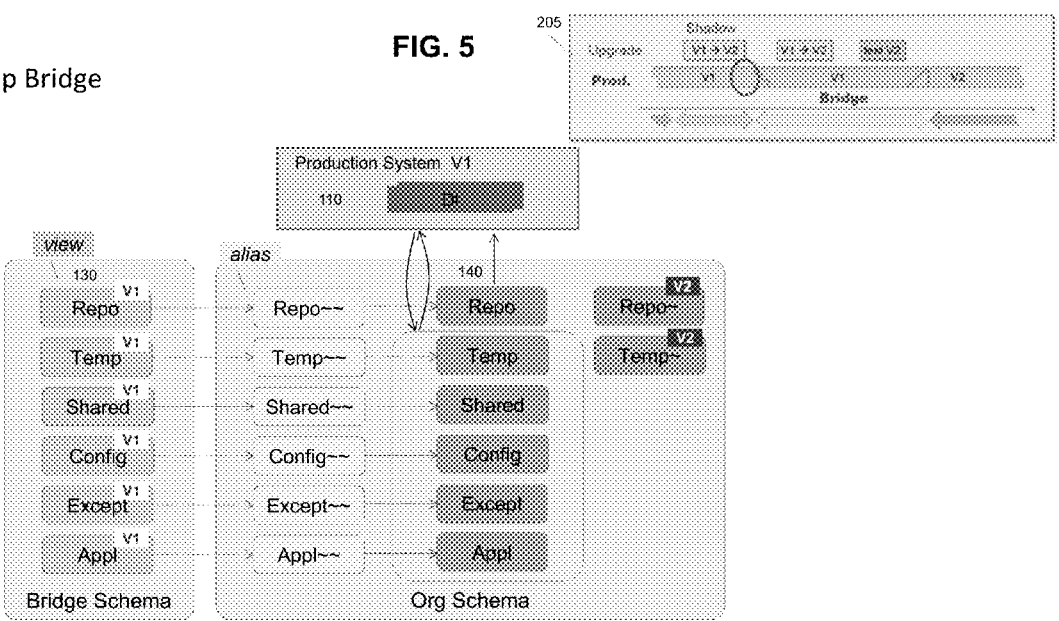

With reference to diagram 500 of FIG. 5, an alias "TABLE~~" for all tables "TABLE" is created. In addition, a second database schema "bridge schema" 130 can be created as well as a view "TABLE" for all aliases in the original schema "TABLE~~".

Figure 6:
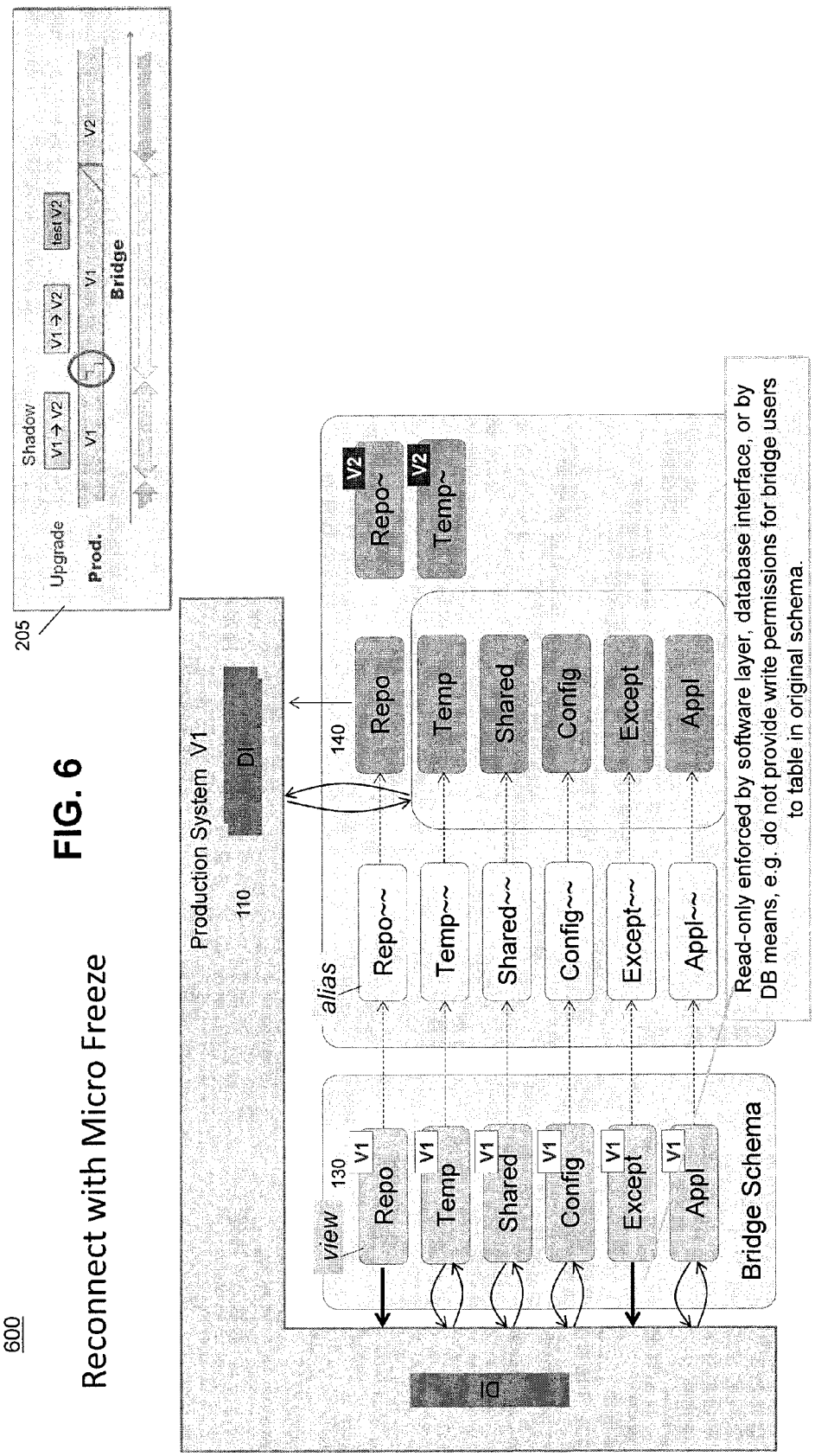

With reference to diagram 600 of FIG. 6, dialog instances can be reconnected from the original schema 140 to the bridge schema 130. The dialog instances "suspend" all actions by users, disconnect from the DB original schema 140 and connect to bridge schema 130. Further, as part of a bridge operation period, production runs on the production system 110 connected to the bridge schema and tables, which will be migrated later, are designated as read-only.

Figure 7:
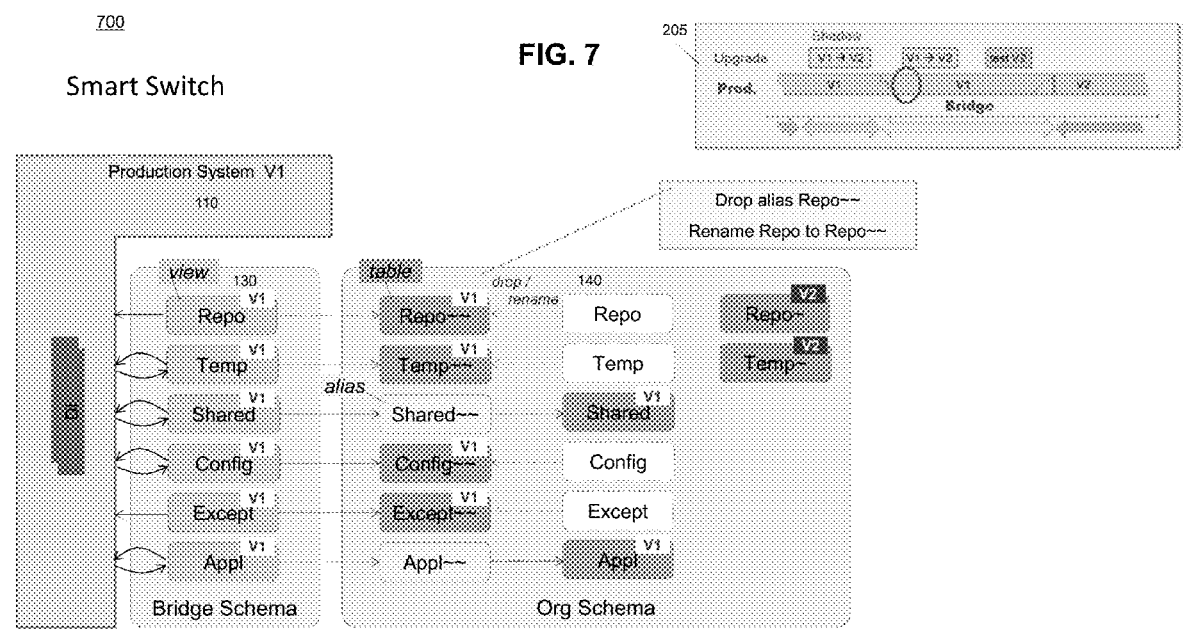

With reference to diagram 700 of FIG. 7, for a smart switch, for those tables that are switched from shadow ("Repo", "Temp") or cloned later, ("Config", "Except"), a smart switch is run. The smart switch causes the alias "Repo~~" to be dropped and the table "Repo" to be renamed to "Repo~~".

Figure 8:
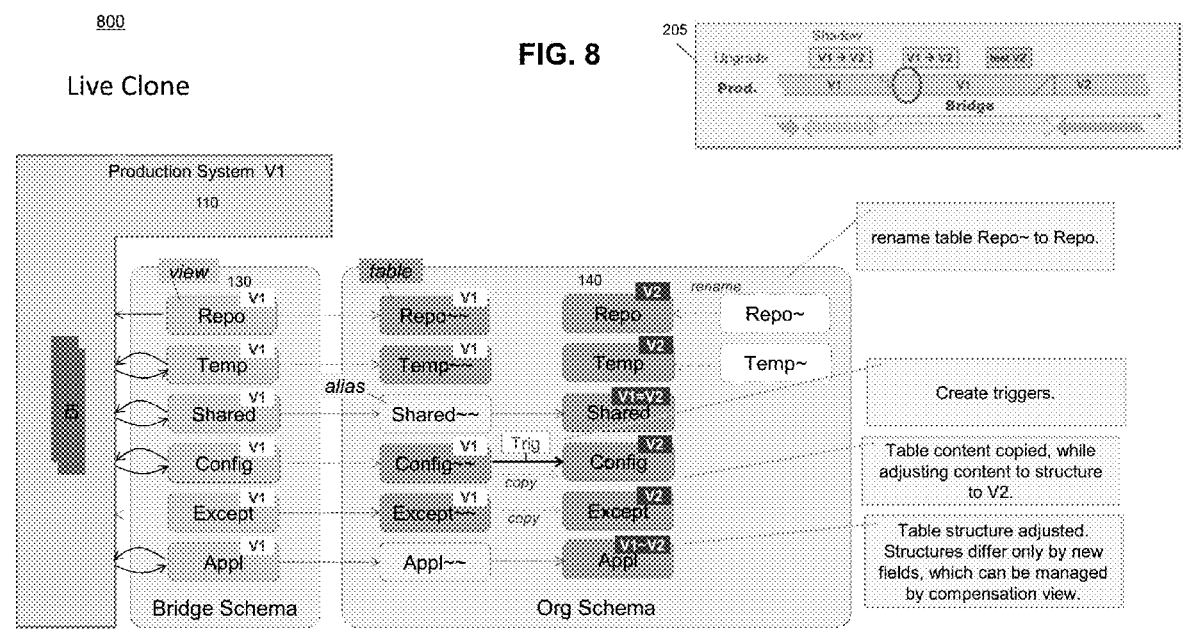

With reference to diagram 800 of FIG. 8, as part of a live clone process, the shadow tables are renamed ("Repo~", "Temp~") and Repo~ is renamed to Repo. The tables are created with the target structure ("Config", "Except"). A trigger is created for the "Config" tables, which transfers all changes done by production to Config~~ to Config. The unchanged data is then copied from Config~~ to Config. The tables, which are shared ("Share" and "Appl") are adjusted structure-wise. New fields can be added (with more complex structure change resulting in the table being in category "Except").

Figure 9:
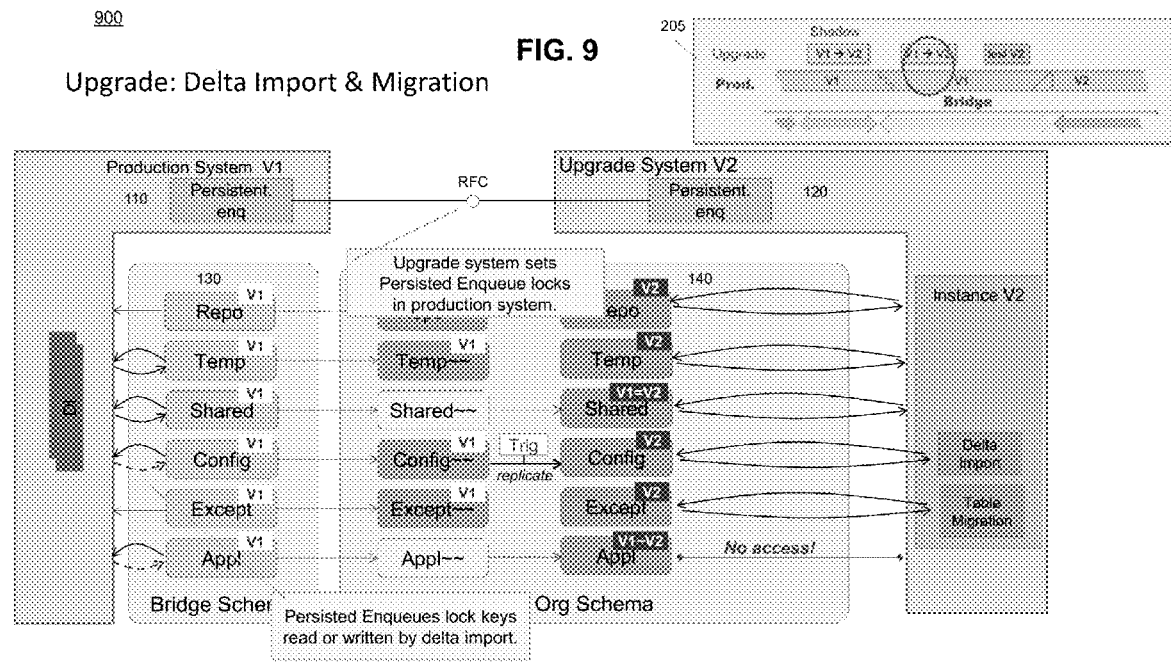

With reference to diagram 900 of FIG. 9, as part of delta import and table migration, the content brought by the upgrade is deployed to the config tables. The import of content can also be done by programs running in the application server. The tools create persistent enqueue locks in the production system for changed keys, where the production shall not change content any mode. For other changes, where production and upgrade change the same keys, the changes are not replicated, the upgrade wins.

Figure 10:
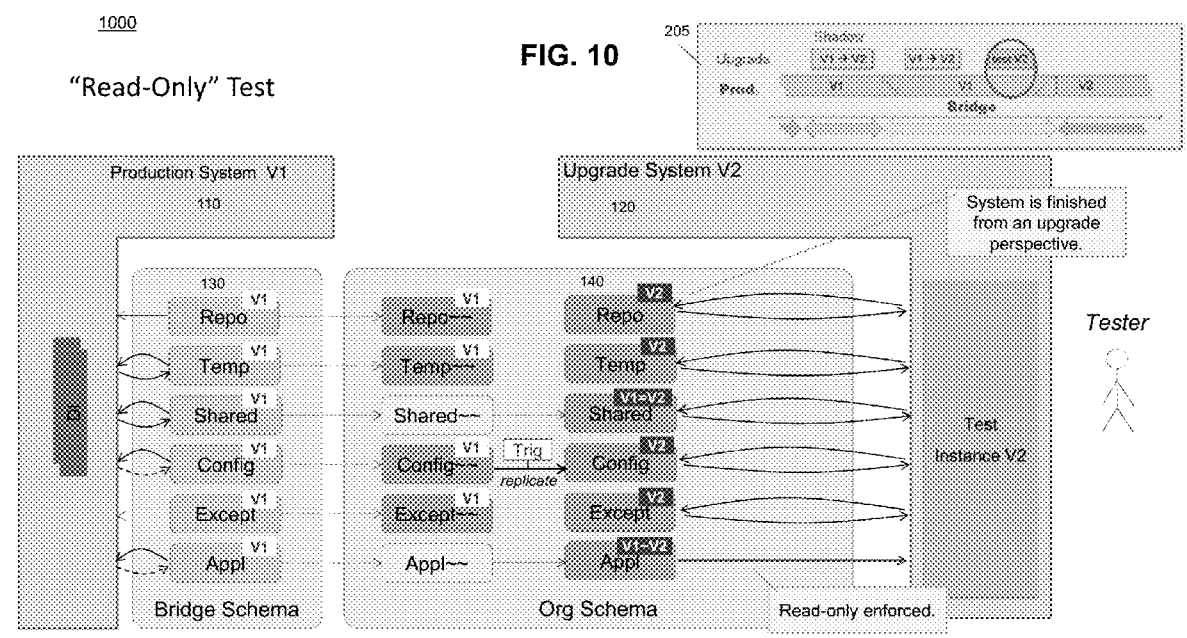

With reference to diagram 1000 of FIG. 10, for read-only tests, the application tables are equipped with freeze triggers. These triggers ensure no content changes can be done by the database user of the original schema 140 for the application tables. For example, upon a write or update attempt, the freeze trigger returns an error code and potentially written data in the open transaction is rolled back by the database. The user of the bridge schema 130 can still change content. In addition, the dialog instances of the upgrade are started and opened for test users. Further, users can read all data, they can write data of category "Repo", "Config", "Share", "Temp" and "Exception". Application data cannot be changed.

Figure 11:
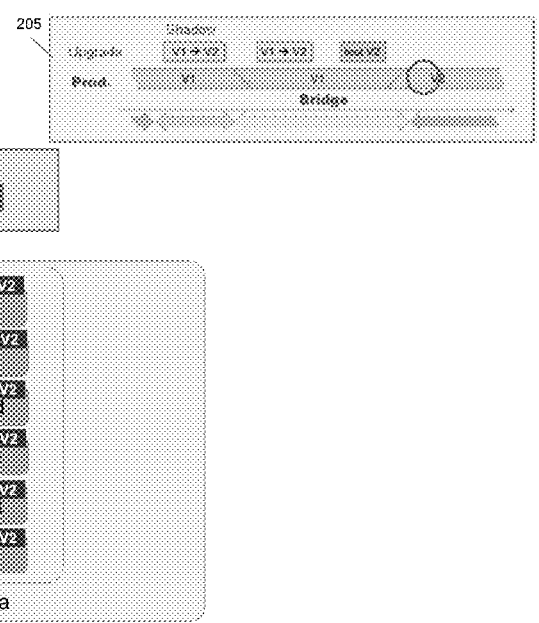

With reference to diagram 1100 of FIG. 11, users of the production system 120 (running V2) can be switched from bridge schema 130 to the original schema 140. Batches are phased out, users are logged off, and queues are run until they become empty.

Figure 12:
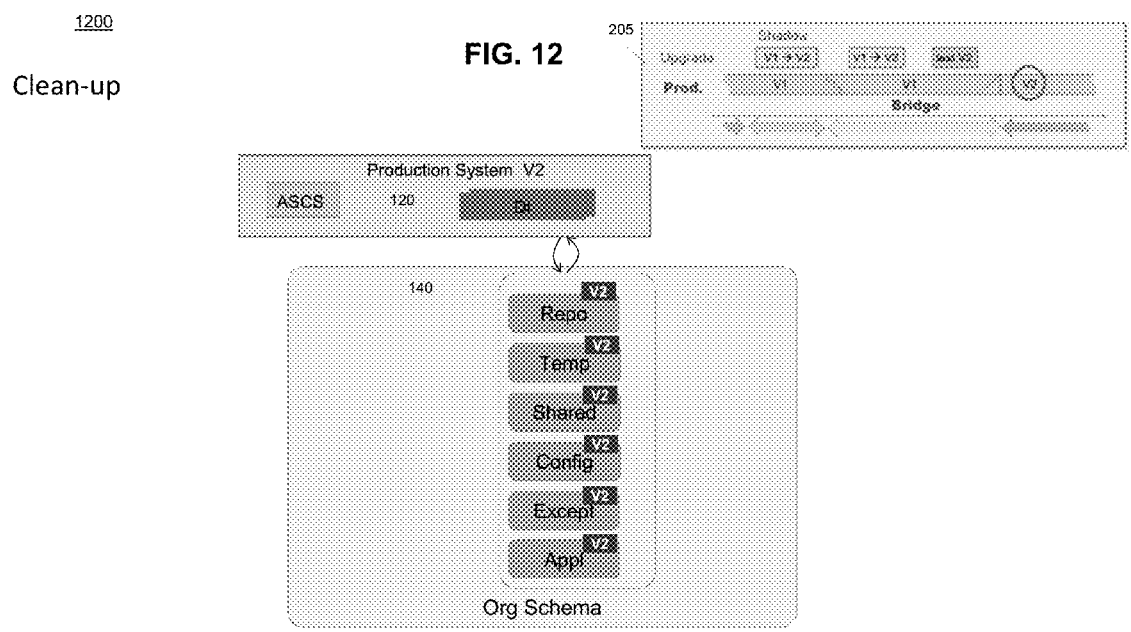

With reference to diagram 1200 of FIG. 12, the target system (production system 120) is next opened for all users. In addition, upgrade artifacts can be cleaned up.

Figure 13:
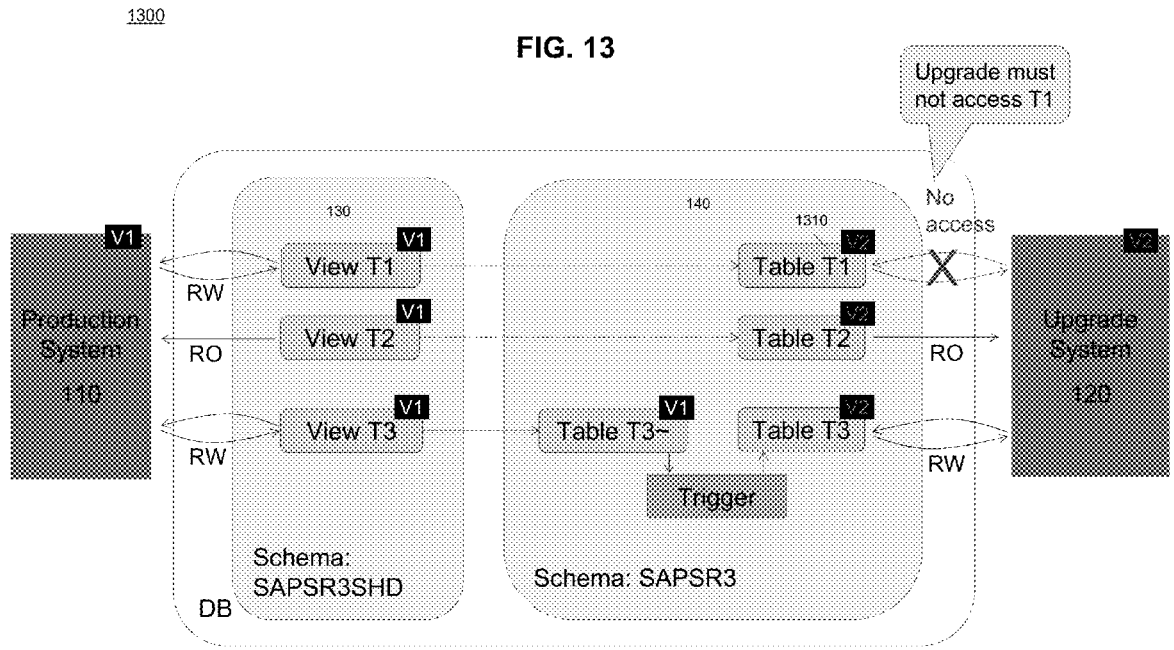
FIG. 13 illustrates table access during a zero downtime upgrade procedure.

With reference to diagram 1300 of FIG. 13 an upgrade of production system 110 to upgrade system 120 is shown. A bridge schema 130 is used for an interaction with an original schema 140 as part of a software update to upgrade system 120 (which will run version 2 of the software once upgraded). As part of the upgrade procedure, Table T1 1310 should not be accessed during the upgrade.

Figure 14:
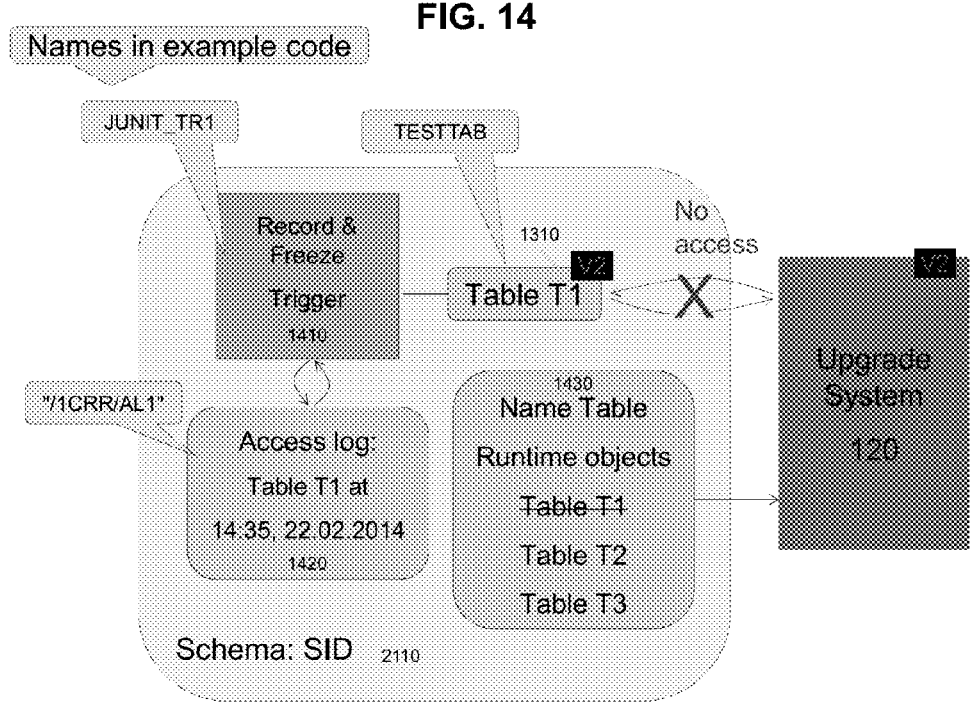
FIG. 14 illustrates selective table access during a zero downtime upgrade.

With reference to diagram 1400 of FIG. 14, an original schema 140 is shown. A record and freeze trigger 1410 can be provided for the table T1 1310 that, together with an access log table 1420, can store time at which Table T1 can be accessed. In addition, among a pool of runtime objects, the runtime object T1 can be removed from the list of available objects in a name table 1430.

The production system 120 and the upgrade system 130 can access the tables in the databases via different database schemas using two database users. This arrangement can be used to distinguish which program writes to a table (e.g., table T1 1310).

Unmanaged tables can be equipped with a database trigger. The trigger can determine the database user eligible to change data in the table T1 1310. If the upgrade user is accessing the table T1 1310, the trigger can write an entry to the logging table 1420. The logging table 1420 can, for example, store the database table name and the accessed key together with the current timestamp. In other variations, there can be a dedicated logging table 1420 for each unmanaged table 1310.

The upgrade procedure can use an upgrade tool that includes a module, which creates the logging tables 1420 and the corresponding database triggers 1410 once the information is known about which tables are managed and which tables are unmanaged. These logging tables 1420 and database triggers 1410 can be generated before the upgrade tool uses the system to run batches, deploys deltas or runs the after-import-methods. The database triggers 1410 can be dropped once these activities are completed.

After the upgrade, the upgrade tool can analyze the logging tables 1420. Entries in these tables 1420 can indicate that there is an error in the metadata or in the upgrade tool analyzing content and structure changes. The timestamp written by the trigger can be used to determine, which upgrade step performed the incorrect access. The upgrade tool or metadata can now be corrected.

This approach can be used in test scenarios in which write accesses (as opposed to read accesses) are identified and logged. Below is pseudocode illustrating same (matching annotations in diagram 1400 of FIG. 14):

```
CREATE OR REPLACE TRIGGER "JUNIT_TR1" AFTER
INSERT OR UPDATE OR DELETE ON "TESTTAB"
    REFERENCING OLD AS OLD NEW AS NEW
    FOR EACH ROW
    DECLARE
      PRAGMA AUTONOMOUS_TRANSACTION;
      v_username varchar2(10);
      trigger_mode VARCHAR2(20);
    BEGIN
      SELECT user INTO v_username FROM dual;
```

```
        IF v_username <> 'SAPSR3SHD' THEN
          BEGIN
            trigger_mode := 'LIVECLONE_LOG_ERROR';
            BEGIN
              SELECT "LCSHAREMODE" INTO trigger_mode FROM
"/1CRR/CO1" WHERE "TABNAME" = 'TESTTAB';
            EXCEPTION
              WHEN NO_DATA_FOUND THEN NULL;
            END;
            IF trigger_mode IN
              ('LIVECLONE_LOG', 'LIVECLONE_LOG_ERROR')
THEN
              BEGIN
                INSERT INTO "/1CRR/AL1" ("TABNAME",
"TIMESTAMP") VALUES('TESTTAB',
to_char(SYSTIMESTAMP,'YYYYMMDDHH24MISS') );
                COMMIT;
                EXCEPTION WHEN DUP_VAL_ON_INDEX THEN
                NULL;
              END;
            END IF;
            IF trigger_mode IN ('LIVECLONE_ERROR',
'LIVECLONE_LOG_ERROR') THEN
              RAISE_APPLICATION_ERROR(-20003, 'ZDM-003: No
changes allowed on table TESTTAB due to sharing.');
            END IF;
          END;
        END IF;
      END;
```

In addition to recording write access in the log tables 1420, read and write accesses to unmanaged tables can be blocked. In some systems, such as ABAP systems, deploy tools and the after-import-methods can use a table runtime object 1430 to manage access (referred to herein as "name table"). The name table 1430 can contain metadata declaration of the database table name, structure, the field names and types and information used by the runtime to configure table caching and so on. If there is no name table object for a table in the name table 1430, the tools cannot access the specified table. Stated differently, a list of runtime objects can be provided (in the form of the name table 1430) that can identify those tables that can be accessed. This list of runtime objects (name table 1430) can be used to control access of the upgrade tools—read and write—to a table by renaming the runtime object in its database table and by clearing the buffered entries of the name table in the application server. If now a program wants to read or write to the table, first the name table 1430 can be read and as the corresponding entry in the name table is missing, an error message can be created.

By exploiting the name tables 1430 in this fashion, it can be secured that the upgrade tool can only accesses managed tables. If an access to an unmanaged table is performed, the error message can be used to analyze, which action caused the illegal access. The upgrade can then be re-configured.

As an alternative to blocking both read and write accesses, write accesses only can be blocked. With such an arrangement, if the access shall be limited to read-only, this cannot be managed by removing the runtime objects from the name table 1430. In this case, a database trigger can be used with a freeze mode. Every insert, update or delete will run into an error message by the database trigger and open database transactions with changed content will be rolled back, while the read accesses can be permitted.

The procedure for testing can be as follows: the test upgrade can be configured to log access violations. The upgrade tool can store this parameter and initiate the subsequent activities. The upgrade tool can create the state where the bridge schema is set up for production usage to the bridge schema. Then the tables for the upgrade—the unmanaged part—can be instrumented to log access violations. The logging triggers can be created for all unmanaged tables and the logging tables can be created. Then the import and the after-import-methods can be run. Then the logging triggers can be deleted. The upgrade is completed. Thereafter, the logging table content can be evaluated. The found violations can be added as metadata for the next test upgrade. The found violations can be added to the set of managed tables in the next upgrade. The test can be repeated until no more access violations occur.

The procedure for the production upgrade can ensure that the production upgrade is configured to prevent access violations. The upgrade tool can store the parameter and initiate the follow-up activities automatically. The procedure can set up the bridge schema and re-direct production usage to the bridge schema. The upgrade tool can then create the freeze triggers, which will disable write access to the unmanaged tables. The upgrade can call the import and the after-import-methods. If no errors occur, the upgrade can be considered as successful and it can complete. If an error occurs, it can be considered that there was an attempt by the upgrade procedures to write to unmanaged tables. The upgrade is thus not successful and a revoke procedure needs to be called to restore the start release. Another test run can then be initiated with the tables having had the access violation now being added to the managed tables of the upgrade.

Alternatively, the same can be done using the name table (runtime object) variant of the approach.

A user read-only test can provide a scenario for the production upgrade. The upgrade tool can be configured to create the setup for read-only tests before the switch from the source system to the target system. The upgrade tool can run the procedure until shortly before the switch from the source system to the target system. The upgrade tool can then prepare the database: the triggers can be created in the database for the unmanaged tables to ensure no data is written by the test to application tables used by production. The procedure can start the application server using the target tables including the triggers and opens the system for access by test users. The procedure can stop and alert the administrator so the test can begin. During the test, users can login to the system and test the application in read-only. During the test certain data can be written (e.g. login information which user logged in and when and which transactions had been called, etc.). Also program generation and compilation can write data and so on. This data can be written to tables managed by the upgrade. This set of tables is known before the upgrade so the tables can be added to the "managed" subset. The application data during such time can be protected against write operations. With this arrangement, the test cannot harm production. If the test passes, the administrator can continue with the upgrade and go live with the new version. If the test fails, the administrator can call the revoke procedure and restore the status of the system before the upgrade. Optionally, the admin can use the read-only test setup to analyze the problem so the problem can be corrected before the next test.

Alternatively, the same can be done using the nametab (runtime object) variant of the approach.

Figure 15:
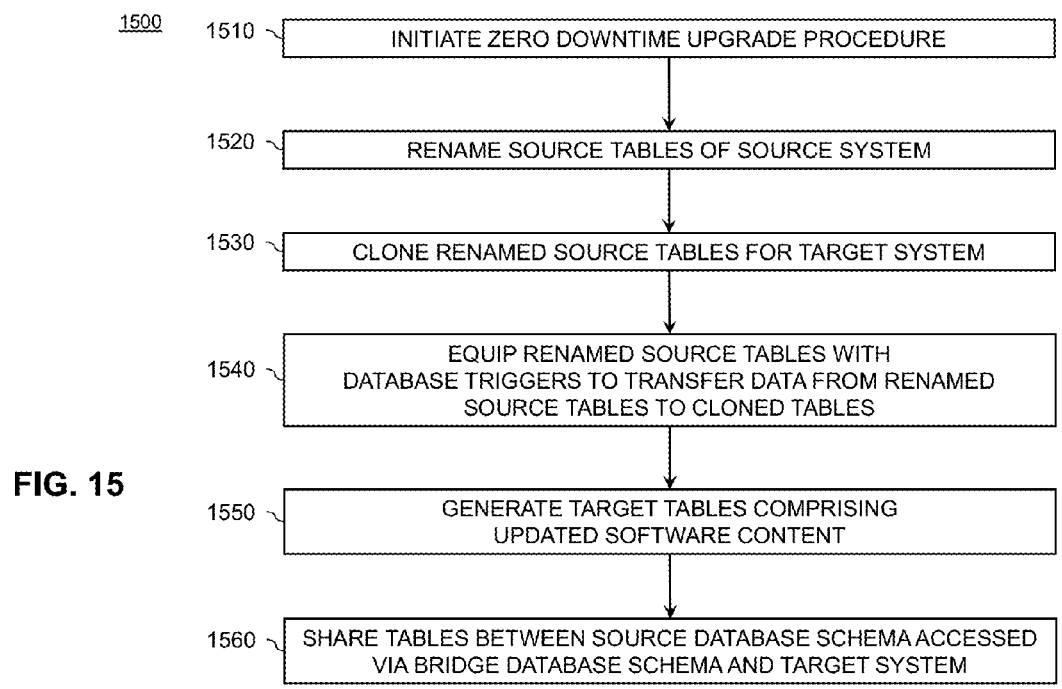
FIG. 15 is a first process flow diagram illustrating data access management during a zero downtime upgrade procedure.

With reference to process flow diagram 1500 of FIG. 15, at 1510, a zero downtime upgrade procedure upgrading a source system to a target system is initiated that prepares software for the target system in parallel to the operation of the source system. As part of the upgrade procedure, at 1520, source tables of the source system are renamed. Thereafter, at 1530, the renamed source tables are cloned for the target system. Further, at 1540, the renamed source tables are equipped with database triggers to transfer data from the renamed source tables to the cloned tables used by the source system according to a source database schema. Next, at 1550, the target tables are generated that include updated software content for later use by the target system while the source tables are used via a bridge database schema. Tables can then be shared, at 1560, between the source database schema accessed via the bridge database schema and the target system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   initiating a zero downtime upgrade procedure upgrading a source system to a target system that prepares software for the target system in parallel to the operation of the source system;
   renaming source tables of the source system;
   cloning the renamed source tables for the target system;
   equipping the renamed source tables with database triggers to transfer data from the renamed source tables to the cloned tables used by the source system according to a source database schema;
   generating the target tables comprising updated software content for later use by the target system while the source tables are used via a bridge database schema; and
   sharing tables between the source database schema accessed via the bridge database schema and the target system.

2. The method of claim 1, wherein restricting access to at least one table other than the cloned tables comprises:
  determining which of a plurality of a tables should have restricted access during the upgrade procedure;
  generating a names table comprising runtime objects corresponding to those tables;
  deleting runtime objects from the names table that cannot be accessed during the upgrade; and
  adding runtime objects to the names table corresponding to those tables that are determined not to be able to be accessed during the upgrade after completion of the upgrade procedure.

3. The method of claim 2, wherein the names table comprises a metadata declaration for each listed runtime object.

4. The method of claim 3, wherein the names table comprises field names and information types for each listed runtime object.

5. The method of claim 1, wherein the restricted access prevents both read and write accesses to the corresponding tables.

6. The method of claim 1 further comprising:
  logging attempts to access the tables with restricted access in a logging table.

7. The method of claim 6, wherein the logging comprises storing the corresponding database table name, the accessed key, and a current timestamp.

8. The method of claim 6, wherein there is a dedicated logging table for each table for which access is requested.

9. The method of claim 6, wherein there is a single logging table for each of a plurality of tables for which access is requested.

10. The method of claim 1, wherein restricting access to at least one table other than the cloned tables comprises:
  preventing both read and write access to the at least one table.

11. The method of claim 1, wherein restricting access to at least one table other than the cloned tables comprises:
  preventing write access to the at least one table while allowing read access to the at least one table.

12. The method of claim 11, further comprising: testing the target system prior to completing the upgrade procedure.

13. The method of claim 1, wherein restricting access to at least one table other than the cloned tables comprises:
  determining which of a plurality of a tables should have restricted write access during the upgrade procedure;
  generating, for each table for which it was determined that should have restricted write access, a database trigger which prevents write accesses to the table; and
  removing the database triggers preventing write access to the tables after completion of the upgrade procedure.

14. A non-transitory computer program product storing instructions, which when executed by at least one data processor forming part of at least one computing system, result in operations comprising:
  initiating a zero downtime upgrade procedure upgrading a source system to a target system that prepares software for the target system in parallel to the operation of the source system;
  renaming source tables of the source system;
  cloning the renamed source tables for the target system;
  equipping the renamed source tables with database triggers to transfer data from the renamed source tables to the cloned tables used by the source system according to a source database schema;
  generating the target tables comprising updated software content for later use by the target system while the source tables are used via a bridge database schema; and
  sharing tables between the source database schema accessed via the bridge database schema and the target system.

15. The computer program product of claim 14, wherein restricting access to at least one table other than the cloned tables comprises:
  determining which of a plurality of a tables should have restricted access during the upgrade procedure;
  generating a names table comprising runtime objects corresponding to those tables;
  deleting runtime objects from the names table that cannot be accessed during the upgrade; and
  adding runtime objects to the names table corresponding to those tables that are determined not to be able to be accessed during the upgrade after completion of the upgrade procedure.

16. The computer program product of claim 15, wherein the names table comprises a metadata declaration for each listed runtime object and comprises field names and information types for each listed runtime object.

17. The computer program product of claim 14, wherein restricting access to at least one table other than the cloned tables comprises:
  determining which of a plurality of a tables should have restricted write access during the upgrade procedure;
  generating, for each table for which it was determined that should have restricted write access, a database trigger which prevents write accesses to the table; and
  removing the database triggers preventing write access to the tables after completion of the upgrade procedure.

18. A system comprising:
  at least one data processor; and
  memory storing instructions, which when executed by the at least one data processor, result in operations comprising:
    initiating a zero downtime upgrade procedure upgrading a source system to a target system that prepares software for the target system in parallel to the operation of the source system;
    renaming source tables of the source system;
    cloning the renamed source tables for the target system;
    equipping the renamed source tables with database triggers to transfer data from the renamed source tables to the cloned tables used by the source system according to a source database schema;
    generating the target tables comprising updated software content for later use by the target system while the source tables are used via a bridge database schema; and
    sharing tables between the source database schema accessed via the bridge database schema and the target system.

19. The system of claim 18, wherein restricting access to at least one table other than the cloned tables comprises:
  determining which of a plurality of a tables should have restricted access during the upgrade procedure;
  generating a names table comprising runtime objects corresponding to those tables;
  deleting runtime objects from the names table that cannot be accessed during the upgrade; and adding runtime objects to the names table corresponding to those tables that are determined not to be able to be accessed during the upgrade after completion of the upgrade procedure.

20. The system of claim 19, wherein restricting access to at least one table other than the cloned tables comprises:
determining which of a plurality of a tables should have restricted write access during the upgrade procedure;
generating, for each table for which it was determined that should have restricted write access, a database trigger which prevents write accesses to the table; and
removing the database triggers preventing write access to the tables after completion of the upgrade procedure.

\* \* \* \* \*